UNITED STATES PATENT OFFICE.

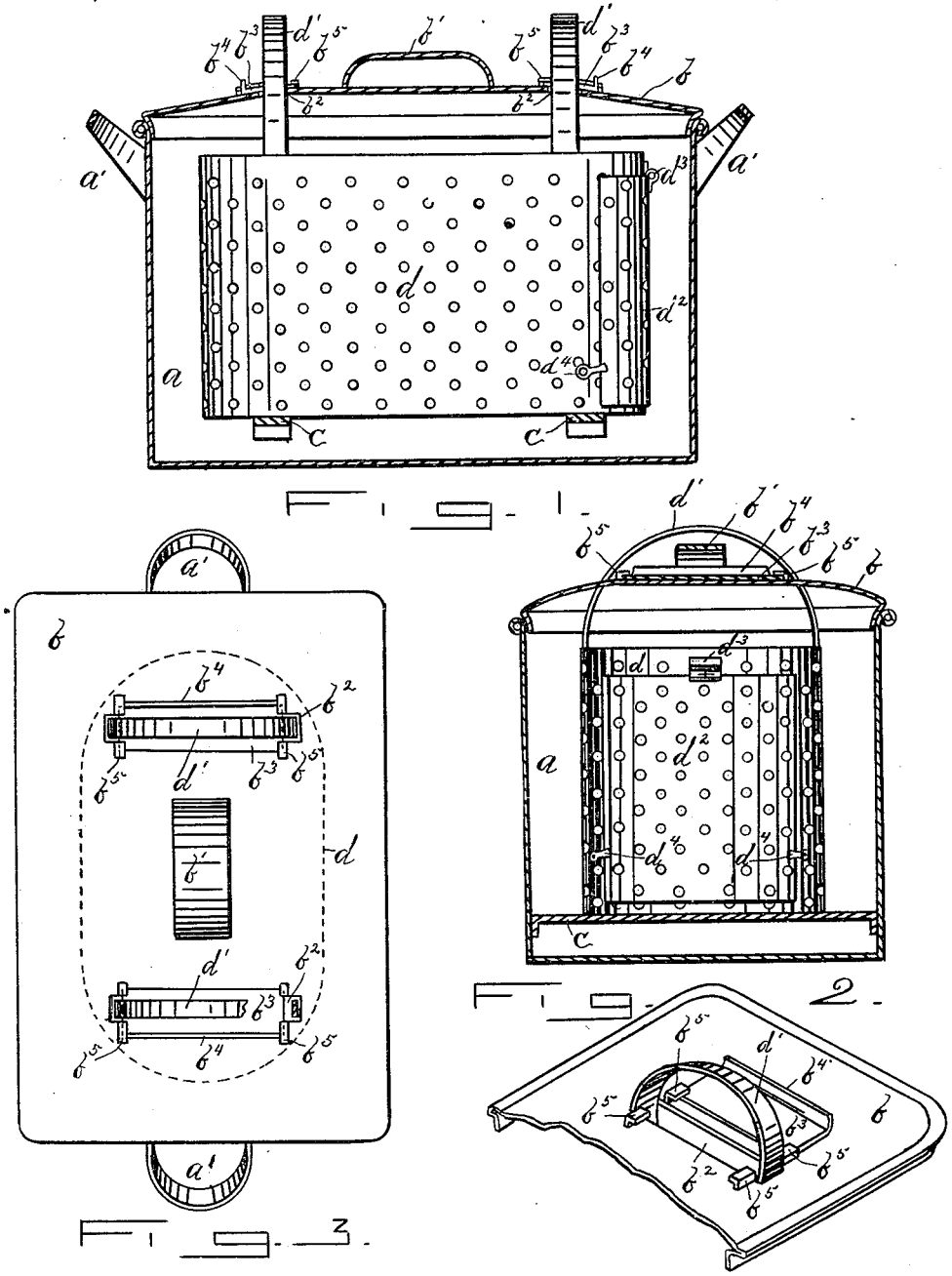

LOUISA KALISKI, OF BUFFALO, NEW YORK.

CLOTHES-BOILER.

SPECIFICATION forming part of Letters Patent No. 353,563, dated November 30, 1886.

Application filed February 6, 1886. Serial No. 191,016. (No model.)

*To all whom it may concern:*

Be it known that I, LOUISA KALISKI, a citizen of the United States, residing at Buffalo, in the county of Erie and State of New York, have invented certain new and useful Improvements in Clothes-Boilers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in boilers for clothes, &c., all of which will be fully hereinafter described and claimed.

In the drawings, Figure 1 is a vertical central longitudinal section. Fig. 2 is a vertical central transverse section, and Fig. 3 is a top plan view, of my improved boiler; and Fig. 4 is a detached fragmentary portion of the cover.

Referring to the drawings, $a$ is the outside vessel, which, with its end handles, $a'$ $a'$, is of the usual construction common to clothes-boilers.

$b$ is the cover, with the central handle, $b'$. Near the ends of this cover are the transverse slots $b^2$ $b^2$, as clearly shown in Fig. 4. $b^3$ is a slide or cover with turned-up end $b^4$, to serve as a handle to adjust the slide. On either side of the slots $b^2$ $b^2$ are the guides $b^5$, between which the slide or cover $b^3$ is moved back and forth across the slots $b^2$ to open and close same. These guides are so arranged as to leave a small opening at each end of the slots $b^2$ when the slide or cover $b^3$ is over same.

Across the lower portion of the vessel $a$ are secured the raised strips or supports $c$ $c$, which are intended to hold the clothes-receptacle, constructed as follows:

$d$ is the body portion of such receptacle, which is preferably of oval form in horizontal cross-section, as shown in dotted lines in Fig. 3. The top of this receptacle is entirely open, and its sides and bottom are reticulated or perforated throughout their entire surface.

$d'$ $d'$ are two bowed handles which are arranged transversely, and extend up some distance above the top of the vessel $a$ when in position.

At one side of the receptacle $d$ is arranged the door $d^2$, which is pivoted to the receptacle at its upper portion at the point $d^3$, thus permitting it to swing out of the way when such receptacle is tipped up. This door $d^2$ is also perforated, and catches $d^4$ $d^4$ on either side serve to hold the door in its closed position.

My improved form of boiler just described is operated as follows: The clothes to be boiled are placed within the receptacle $d$, the door $d^2$ being closed and locked. The receptacle $d$ is then placed upon the supports $c$ $c$, within the vessel $a$, and the cover $b$ is placed thereon, the handles $d'$ $d'$ of receptacle $d$ passing up into the slots $b^2$ $b^2$ of the cover, which serves to hold such receptacle in a central position within the vessel $a$, thereby leaving a space between the walls and bottoms of the two vessels $a$ and $d$. The slides $b^3$ $b^3$ are then pushed in their guides across the slots $b^2$ $b^2$, closing same and preventing escape of steam, the sides of the handles $d'$ $d'$ resting in the small open spaces at the ends of the slots $b^2$. Water and soap having been previously introduced, the boiling of the clothes is then commenced, after which the slides $b^3$ $b^3$ are moved back from over the slots $b^2$ $b^2$, the cover $b$ is removed, the receptacle $d$, with its clothes, is lifted out by the handles $d'$ $d'$, the catches $d^4$ $d^4$ thrown back, and on tipping the receptacle the door $d^2$ swings open and the clothes fall out, it not being necessary with this improved construction to touch the hot boiled clothes with the hand, or to use a stick, as is now commonly done.

It is apparent that my improved boiler is additionally adapted for cooking purposes without any change in construction.

I claim—

1. A boiler for clothes, &c., consisting of the vessel $a$, with raised supports $c$ $c$, and the cover $b$, provided with the transverse slots $b^2$ $b^2$, with slides or covers $b^3$ $b^3$, and the perforated clothes-receptacle $d$, having the high handles $d'$ $d'$, adapted to rest within the slots $b^2$ $b^2$ of cover $b$, substantially as shown and described.

2. A boiler for clothes, &c., consisting of the vessel $a$, with raised supports $c\ c$, and the cover $b$, provided with the transverse slots $b^2$ $b^2$, with slides or covers $b^3\ b^3$, and the perforated clothes-receptacle $d$, having the high handles $d'\ d'$, adapted to rest within the slots $b^2\ b^2$ of the cover, and the door $d^2$, pivoted at its top to the receptacle, substantially as and for the purpose stated.

In testimony whereof I have signed my name to this specification in the presence of two subscribing witnesses.

LOUISA KALISKI.

Witnesses:
MANNO KALISKI.
W. T. MILLER.